A. STORRIE.
MILK RELEASER.
APPLICATION FILED NOV. 1, 1913.
1,109,370.
Patented Sept. 1, 1914.
3 SHEETS—SHEET 1.
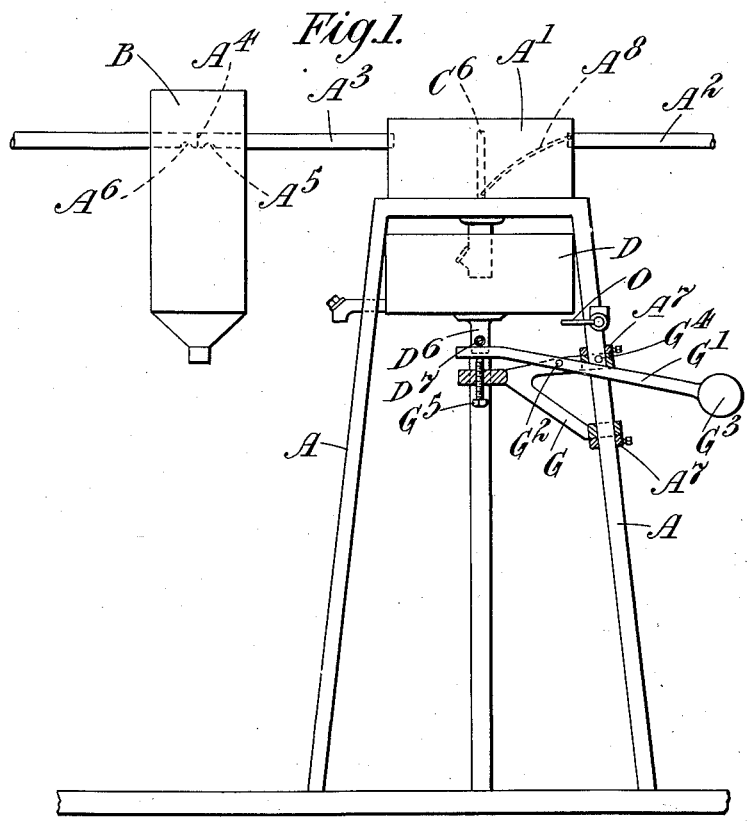
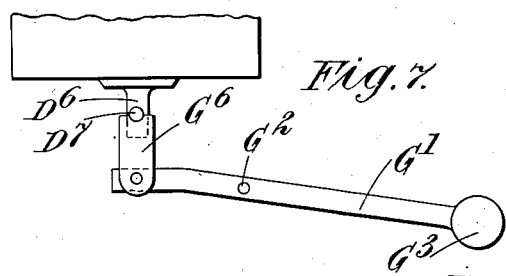
Witnesses.
Jesse B. Heller
J. B. Bleming
Inventor.
Alexander Storrie,
by Bakewell, Byrnes Parmelee,
Attys.

A. STORRIE.
MILK RELEASER.
APPLICATION FILED NOV. 1, 1913.
1,109,370.
Patented Sept. 1, 1914.
3 SHEETS—SHEET 2.
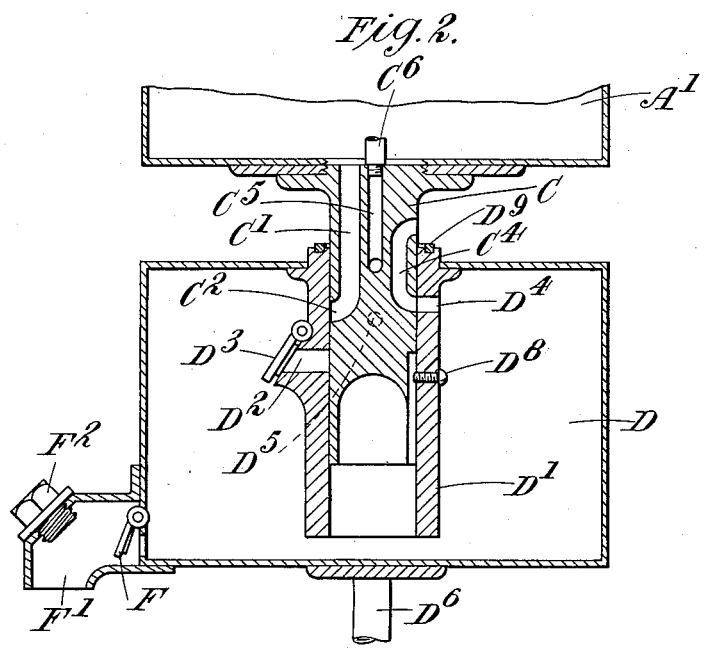
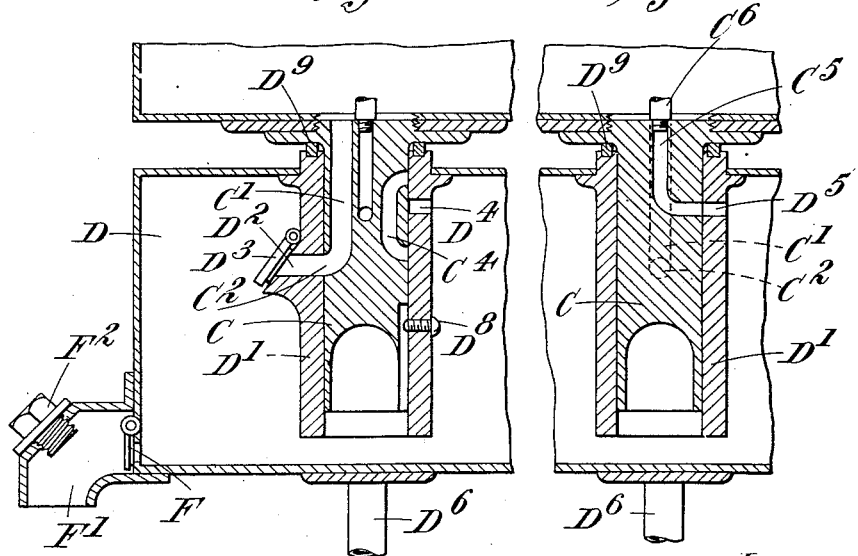

A. STORRIE.
MILK RELEASER.
APPLICATION FILED NOV. 1, 1913.
1,109,370.
Patented Sept. 1, 1914.
3 SHEETS—SHEET 3.
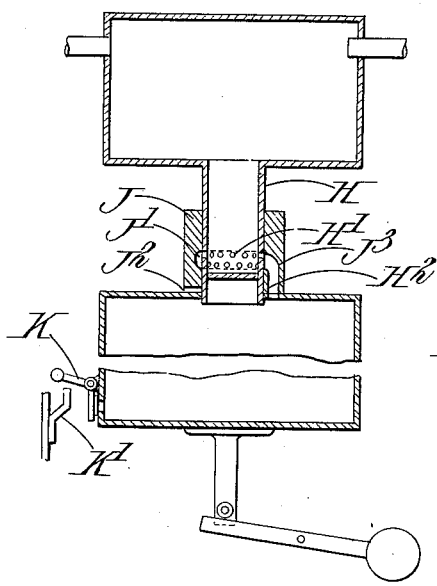
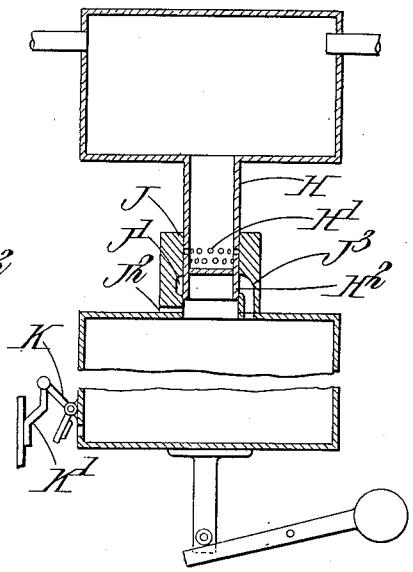

UNITED STATES PATENT OFFICE.

ALEXANDER STORRIE, OF INVERCARGILL, NEW ZEALAND.

MILK-RELEASER.

1,109,370.   Specification of Letters Patent.   Patented Sept. 1, 1914.

Application filed November 1, 1913. Serial No. 798,719.

*To all whom it may concern:*

Be it known that I, ALEXANDER STORRIE, a subject of the King of England, residing at Invercargill, New Zealand, have invented certain new and useful Improvements in Milk-Releasers, of which the following is a specification.

The present invention relates to milk releasers of the type wherein two milk receiving chambers are employed and the weight of the liquid in the one chamber is made to move this chamber down for the discharge of the milk and for operating control ports so that the other chamber commences to fill without destroying the vacuum. Such milk releasers are used in conjunction with vacuum milking machines by means of which a number of cows are milked at one time and the milk from all is collected into a single system of piping and discharged into a reservoir under the action of an air exhauster which produces a partial vacuum in the system. It is necessary that the reservoir should be closed to the outside atmosphere in order that the vacuum may not be broken down and as it is undesirable to use a big reservoir it is necessary to discharge the milk from the reservoir to the usual cans by means of a device which, while permitting such discharge from the reservoir will yet not impair the vacuum in the system. Such mechanism is known as a milk releaser and it is an object of the present invention to provide an improved milk releaser which will be continuous and automatic in its action while the milking is going on.

The present invention contemplates the provision of a milk releaser of the type specified wherein one chamber is fixed and the other is movable, and the latter is raised by a yielding control and is held up by means of the combined action of the said yielding control and of atmospheric pressure. It is found that such a construction is of great advantage in that the yielding control, which may be a weighted lever, need only be sufficiently strong to raise the movable chamber to its uppermost position, while the atmospheric pressure acting upon the outside of the chamber against the reduced pressure inside is sufficient to counterbalance the weight of the milk which is discharged into the chamber until such a time as the chamber is almost full. In this manner the complexity of the construction is reduced together with the weight and consequently the cost of the releaser.

The invention further contemplates a milk releaser of the type specified having a ported member on the fixed chamber and a second ported member on the movable chamber so arranged that movement of one chamber opens communication between the two chambers or shuts off such communication as the case may be.

In the construction about to be described there is an upper fixed chamber having on its lower side a depending trunk which is surrounded by a sleeve fixed to the upper side of an under chamber that is movable in the direction of the axis of the sleeve. A port in the sleeve is provided and is adapted to register with a port in the trunk to permit the milk to pass from the upper chamber to the lower. Normally the lower chamber is held at the uppermost limit of its travel by means of a weighted lever and in this position the ports register so that the milk passes to the lower chamber. When sufficient milk is in the lower chamber to overcome the action of the vacuum and the weight upon the lever the chamber sinks and the ports no longer registers so that milk does not then pass.

According to another feature of the invention the lower chamber is provided with a discharge valve which is normally held closed by means of the vacuum in the chamber. When the lower chamber sinks it is adapted to cause an air port in the trunk to establish communication between the lower chamber and the atmosphere, thus breaking down the vacuum in the said chamber so that the discharge valve opens by the weight of the milk and the latter is discharged. When the chamber is empty the weighted lever raises it to its uppermost position, closes the communication with the atmosphere, and opens communication with the upper chamber. The air in the lower chamber is thus exhausted and according to a feature of the invention an auxiliary port is provided in the sleeve to register with an auxiliary port in the trunk, which latter port communicates with a pipe having an exit near the top of the upper chamber. A valve is also provided to close the passage between the milk port in the sleeve and the lower chamber. Thus the air exhausted from the lower chamber does not pass by way of the milk passage but by way of the special auxiliary ports and pipe so that it has not to pass through the milk in the upper chamber. This is very important, since when air passes through the body of the milk it causes bubbling and is liable to carry off some of the milk into the pipe system which thus becomes foul, besides causing a wastage of milk. In conjunction with this mechanism a baffle plate may also be provided to prevent the air from the pipe coming into contact with the milk as it is discharged into the upper chamber.

These and other features of the invention will now be described in connection with the accompanying drawings, but it is to be understood that this description is by way of exemplification of the invention and not of limitation since the details of construction and arrangement of parts may be modified without departing from the spirit thereof.

In the accompanying drawings:—Figure 1 is a front elevation of a milk releaser according to this invention; Fig. 2 is a partial sectional elevation of the releaser shown in Fig. 1 showing the lower chamber in its lowest position; Fig. 3 is a sectional elevation of the parts shown in Fig. 2 showing the lower chamber raised; Fig. 4 is a vertical section of Fig. 3; Fig. 5 is a partial sectional elevation of a modification showing the lower chamber raised; Fig. 6 is a view similar to Fig. 5 but showing the lower chamber in its lowest position, and Fig. 7 shows a modification of a supporting lever.

Like reference characters indicate like parts throughout the drawings.

Referring to Figs. 1, 2, 3 and 4, a stand A has fixed upon it a closed chamber or milk container $A'$ into which a pipe $A^2$ connected to the usual milking system discharges the milk. A second pipe $A^3$ connects the chamber with the vacuum producing mechanism. In order to prevent moisture from passing to the air exhauster a drip tank B is provided and the pipe $A^3$ is passed therethrough. The pipe is provided with a partition $A^4$ and with holes $A^5$, $A^6$ on either side thereof so that the air when extracted from the chamber $A'$ will pass out of the pipe into the tank by means of the hole $A^5$ and will pass back into the pipe at $A^6$. Any moisture in the air will have a tendency to remain in the drip tank so that should any milk be accidentally sprayed and carried over by the air into the pipe it will be left behind and will not pass to the exhauster.

The chamber $A'$ has screwed into its lower side a trunk C provided with a passage $C'$ and with a port $C^2$. A second closed chamber D is provided internally with a sleeve $D'$ of such a size as to form a sliding fit upon the trunk C. This sleeve is provided with a port $D^2$ having a flap valve $D^3$ at its outer side, this port being adapted to be brought into communication with the port $C^2$. The sleeve D is also provided with an air port $D^4$ which is adapted to communicate with a passage $C^4$ in the trunk whose other end is open to the atmosphere during such communication. The sleeve $D'$ is also provided with an auxiliary port $D^5$ which may be brought into communication with a passage $C^5$ in the trunk, this passage having at its uppper end a pipe $C^6$ which extends nearly to the top of the upper chamber $A'$.

The lower chamber D is provided with a discharge valve F preferably of the flap type. This valve is protected by a hood or faucet $F'$ so that milk flowing therefrom may be guided into any suitable receiving vessel, or it may be a strainer. The faucet is provided with a screwed cap $F^2$, the removal of which permits the introduction of a brush for cleaning the valve F and the neighboring parts. The lower chamber D has attached to its underside a bracket $D^6$ to which is attached a stud carrying a roll $D^7$. A bracket G is carried upon the stand A being adjusted thereon by means of collars $A^7$. A lever $G'$ is pivoted to the bracket G by means of a pin $G^2$, one end of the lever lying underneath the roll $D^7$ and the other end being provided with a weight $G^3$ which, if desired, may be adjustable, and which is just sufficient to raise the lower chamber when empty.

A pin $G^4$ passes through the bracket G and the stand A to hold the bracket in operative position below the lower chamber, but by removing the pin the bracket and the lever may be swung aside to allow the chamber to be lowered and removed for cleaning purposes. In order to prevent the lower chamber from turning during the normal reciprocation of the chamber a screw $D^8$ passes through the sleeve $D'$ and engages a groove in the trunk. The bracket G is provided with a screw $G^5$ which will adjustably limit the descent of the lower chamber.

In order to prevent jarring during the reciprocation of the lower chamber it is provided upon its upper side with a rubber washer $D^9$ adapted to contact with the underside of the flange of the trunk. If desired a baffle plate $A^8$ may be fixed in the upper chamber $A'$ to prevent the milk as it is discharged from the pipe $A^2$ coming into contact with the air which is discharged from the upper end of the pipe $C^6$. By means of such a baffle plate liability of moisture being carried over to the pipe A³ by the extracted air is still further reduced.

The operation of the mechanism is as follows:—The lower chamber D being empty is held in its raised position, as shown in Fig. 3, by the lever G'. Air is drawn from the upper chamber A' through the pipe A³ and from the lower chamber through the pipe C⁶, for in this position of the parts the air port D⁵ registers with the passage C⁵. If it were not for this passage and the valve D³ the air would be drawn through the port D² and passage C' and through the milk, but the air will take an unrestricted passage rather than pass through the descending milk in the passage C'. As the milk flows into the upper chamber A' from the pipe A² it will pass on through the passage C' and ports C², D² and past the valve D³ into the lower chamber and will be held there since the valve F is held in its closed position by reason of the vacuum in the chamber.

When the weight of milk in the lower chamber is sufficient to overcome the weight G³ and the influence of the vacuum upon the trunk C the lower chamber will descend into the position shown in Fig. 2. In this position the ports D² and D⁵ no longer register with the passages C' and C⁵ but on the other hand the air port D⁴ will register with the passage C⁴ and will thus permit communication with the atmosphere which rushes into the chamber D until the pressure therein is equal to atmospheric pressure. Consequently the weight of the milk will open the valve F and the milk will be discharged from the lower chamber without breaking down the vacuum in the upper chamber and the vacuum system connected therewith.

After the lower chamber has been emptied the weight G³ will again raise the said chamber and cut off the port D⁴ from communication with the atmosphere, at the same time causing registration of the ports D³ and D⁵ with the openings to the passages C³ and C⁵. The air in the lower chamber is again withdrawn through the pipe C⁶ without being passed through the milk, and the valve F is closed.

It will be understood that this apparatus acts not only as a milk releaser but also as a milk measurer, since it sinks to discharge the milk from the lower chamber only after the balance weight G³ is overcome.

The lever G' instead of bearing directly upon the roll D⁷ may have pivoted to it a link G⁶ recessed at the top to receive the roll and also recessed to form a guideway for the lower end of the bracket D⁶. By this means the lever G' is spaced so far from the bracket D⁶ that by swinging the link G⁶ from underneath the roll D⁷ the lower chamber D may be lowered sufficiently far to remove it for cleaning without the trouble of swinging the bracket G to remove the lever as in the former construction.

A modification illustrated in Figs. 5 and 6 will now be described. In this case the upper chamber is provided with a depending trunk or cylinder H that is open at the top to the chamber and is closed at the bottom by the end of the cylinder. Near the lower end of the trunk or cylinder H are a number of holes H' for the passage of the milk. The lower chamber is provided with an upstanding sleeve J to encircle the cylinder H, this sleeve being provided with an annular groove J' into which the holes H' open when the lower chamber is at the top of its stroke. A passage J³ forms a communication between the annular groove J' and the interior of the lower chamber. The sleeve is also provided with an air passage J² which when the holes H' are in communication with the groove J' is closed by means of an extension H² depending from the cylinder H. When the lower chamber descends the holes H' are removed from communication with the groove J' so that no milk flows from the upper to the lower chamber and at the same time the petticoat H² rises sufficiently to clear the passage J² so that atmospheric air is permitted to enter the lower chamber and equalizes the pressure therein as in the former construction. In this construction the outlet valve of the lower chamber is provided with an arm K which when the chamber sinks contacts with the striker K' and thus opens the valve.

Any ordinary counting mechanism may be employed, one form being shown in Fig. 1, in which a striker O is adapted to contact with the lower chamber each time that the said chamber sinks. By this means the number of reciprocations of the chamber may be counted and consequently the number of gallons of milk may be approximately estimated.

What I claim as my invention and desire to secure by Letters Patent is:—

1. A milk releaser comprising a plurality of chambers, means for moving one chamber relative to the other, communicating passages between said chambers arranged to be opened and closed by the relative movement of the chambers, means for admitting milk to one of said chambers, means for continuously exhausting the air from one of said chambers and from the other when shifted in proper position with relation thereto, the passages being arranged to permit milk to flow from one chamber to the other chamber when the chambers are in proper relation to each other, and means for withdrawing the milk from the last mentioned chamber when the chambers are moved to the position to close the communicating passages between the chambers, substantially as described.

2. A milk releaser comprising a fixed chamber and a movable chamber, a milk inlet pipe connected to the fixed chamber, an air exhaust pipe connected to the fixed chamber, mechanical means for raising the movable chamber with relation to the fixed chamber, there being communicating passages between the fixed chamber and the movable chamber arranged to be opened when the movable chamber is in its elevated position to permit the milk to flow from the fixed chamber to the movable chamber, and exhaust the air from the movable chamber, there being a port in the movable chamber arranged to be opened to the atmosphere when the movable chamber is in its lowest position, and a valve in the movable chamber to be opened to permit milk to flow therefrom when the movable chamber is in its lowermost position, substantially as described.

3. A milk releaser, comprising a retainer, a milk inlet connected to said retainer, an air exhaust pipe from said retainer, an automatic emptying and measuring device connected to said retainer, there being ports leading from said retainer and arranged to communicate with the emptying and measuring device, raising means for moving the measuring device to open said ports to permit the air to be exhausted from the measuring device and to allow the milk to flow from the retainer to the measuring device, said measuring device being arranged to be held in proper position with relation to the retainer to keep the ports and passages open by the raising means and the atmospheric pressure on the outside of the measuring device, and adapted to move downward against the action of the raising means and the atmospheric pressure when a predetermined amount of milk has passed to the measuring device, and means for automatically releasing the milk from the measuring device when it has moved downwardly and closed the ports and passages between the measuring device and retainer, substantially as described.

4. A milk releaser comprising a fixed chamber, a milk inlet leading to said chamber, an air exhaust pipe leading from said chamber, a hollow stem extending downwardly from said chamber, a movable chamber slidably mounted on said stem, there being ports for opening communication between the movable chamber and the fixed chamber when the movable chamber is in its elevated position, to permit the milk to flow from the fixed chamber to the movable chamber and air from the movable chamber to the fixed chamber, means for raising the movable chamber relative to the fixed chamber, and means for admitting air to the movable chamber when in its lowermost position, and means for permitting milk to flow from the movable chamber when in its lowered position, substantially as described.

5. A milk releaser comprising a fixed chamber, a milk inlet pipe connected to said chamber, an air exhaust pipe connected to said chamber, a baffle within said chamber between said pipes, a hollow stem extending downwardly from said chamber, a movable chamber slidably mounted on said stem, there being ports for opening communication between the movable chamber and the fixed chamber when the movable chamber is in its elevated position, to permit the milk to flow from the fixed chamber to the movable chamber and air from the movable chamber to the fixed chamber, means for raising the movable chamber relative to the fixed chamber, and means for admitting air to the movable chamber when in its lowermost position, and means for permitting milk to flow from the movable chamber when in its lowered position, substantially as described.

6. A milk releaser comprising a fixed chamber, a milk inlet pipe leading to said chamber, an air exhaust pipe leading from said chamber, a drip tank connected to the latter pipe, means for causing the air to pass in reverse directions through said drip tank to separate any moisture from the air, a hollow stem extending downwardly from said chamber, a movable chamber slidably mounted on said stem, there being ports for opening communication between the movable chamber and the fixed chamber when the movable chamber is in its elevated position, to permit the milk to flow from the fixed chamber to the movable chamber and air from the movable chamber to the fixed chamber, means for raising the movable chamber relative to the fixed chamber, and means for admitting air to the movable chamber when in its lowermost position, and means for permitting milk to flow from the movable chamber when in its lowered position, substantially as described.

7. A milk releaser, comprising a fixed chamber, a milk inlet pipe connected to said chamber, an air exhaust pipe connected to said chamber, a stem extending downwardly from said chamber, a movable chamber having an internal sleeve slidably mounted on said stem, there being two passages in said stem communicating with the fixed chamber, there being a third passage in said stem communicating with the atmosphere, a port extending through said sleeve arranged to open communication between the movable chamber and the atmosphere when the movable chamber is in its lowermost position, a plurality of ports extending through the sleeve and arranged to register with the other passages in the stem when the movable chamber is in its elevated position to open communications between the movable chamber and the stationary chamber, and means for elevating the movable chamber, and means for permitting milk to flow from the movable chamber when in its lowered position, substantially as described.

In testimony whereof I have signed my name to this specification in the presence of two subscribing witnesses.

ALEXANDER STORRIE.

Witnesses:
J. ARTHUR COOK,
FRANCIS G. COBB.